United States Patent [19]
Kato

[11] 4,390,251
[45] Jun. 28, 1983

[54] PHOTOGRAPHIC OBJECTIVES OF RELATIVELY LARGE APERTURE

[75] Inventor: Masatake Kato, Kunitachi, Japan

[73] Assignee: Canon Kabushiki Kaisha, Tokyo, Japan

[21] Appl. No.: 298,331

[22] Filed: Aug. 31, 1981

[30] Foreign Application Priority Data

Sep. 3, 1980 [JP] Japan .................................. 55-122185

[51] Int. Cl.³ ............................................... G02B 9/60
[52] U.S. Cl. .................................................... 350/467
[58] Field of Search ......................................... 350/467

[56] References Cited
FOREIGN PATENT DOCUMENTS

| 55-100520 | 7/1980 | Japan | 350/467 |
| 291256 | 9/1953 | Sweden | 350/467 |

*Primary Examiner*—John K. Corbin
*Assistant Examiner*—Rebecca D. Gass
*Attorney, Agent, or Firm*—Toren, McGeady and Stanger

[57] ABSTRACT

The disclosed objective includes a first lens group of positive power and a second lens group of positive power, the first group having, from front to rear, a positive lens with its front surface convex toward the front, a positive meniscus lens of forward convexity, and a negative meniscus lens of rearward convexity, the second lens group having a cemented lens and a positive lens, with the cemented lens composed of a negative lens and a positive lens. When focusing down from infinity toward closer distances, the lens groups are moved forward while the air separation between the lens groups is simultaneously widened. The glasses of the lenses in the first lens group and the characteristics of the lenses in the second lens group are selected to achieve good aberrational correction throughout the focusing range from infinity to close distances.

1 Claim, 20 Drawing Figures

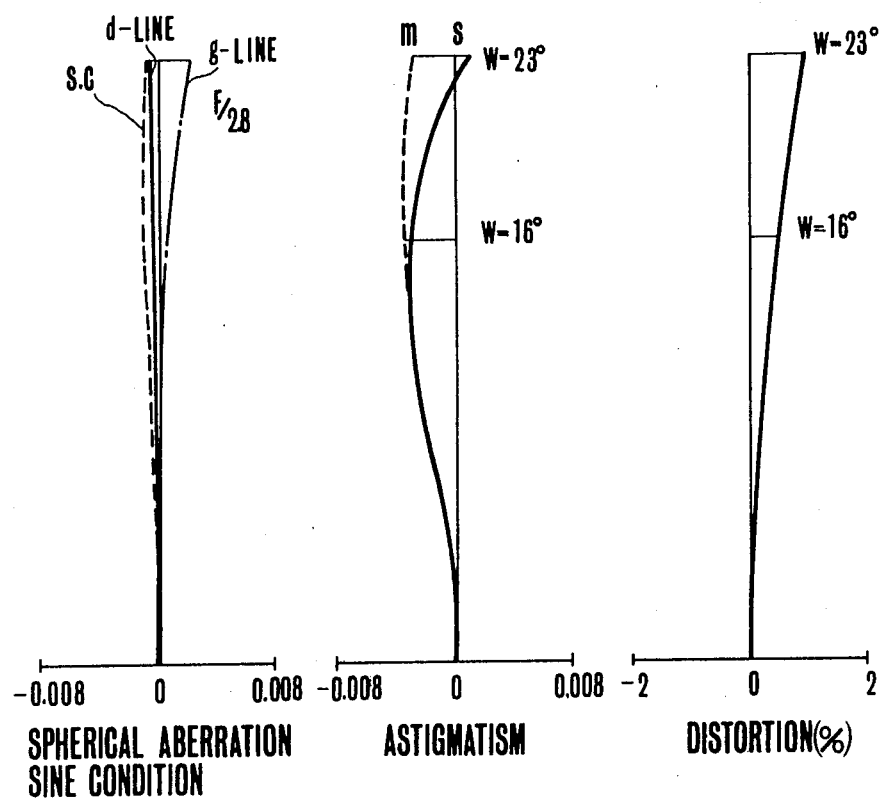

FIG.4a  FIG.4b  FIG.4c
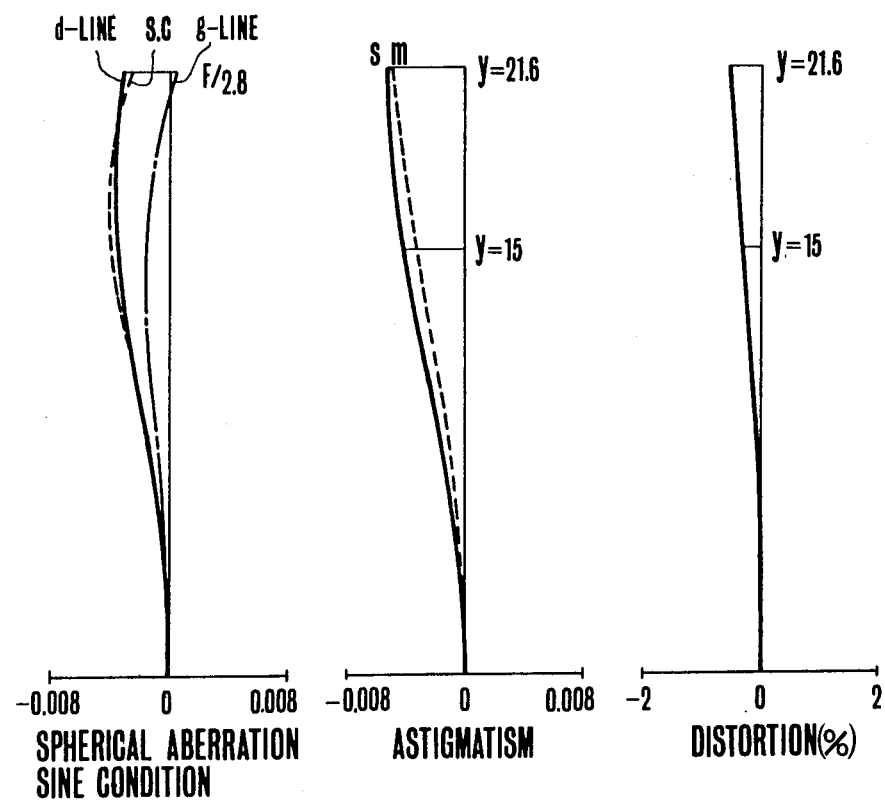
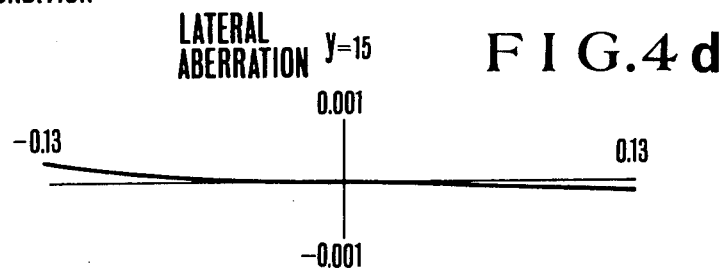
FIG.4d

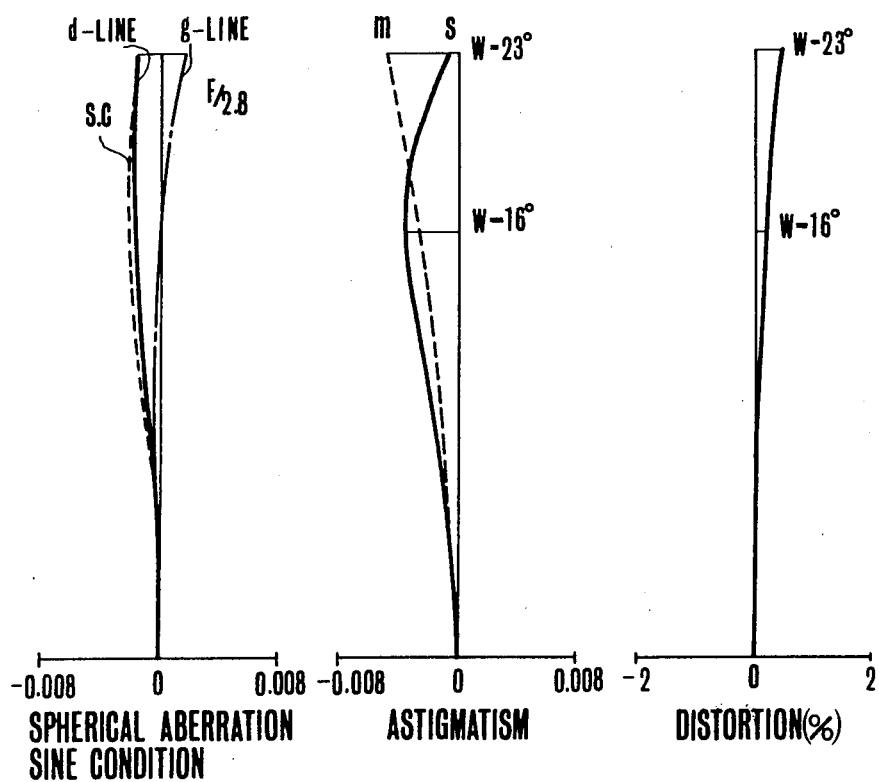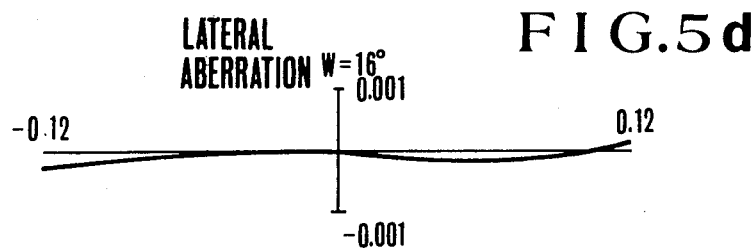

PHOTOGRAPHIC OBJECTIVES OF RELATIVELY LARGE APERTURE

BACKGROUND OF THE INVENTION

1. Field of the Invention

This invention relates to objective lenses of large relative aperture which are capable of high grade imaging performance throughout a focusing range from infinity to extremely short object distances.

2. Description of the Prior Art

General purpose photographic objectives are corrected for aberrations to provide the best performance when focused at infinity. On the other hand, macro objectives which are used principally for close-up photography have to take into account the fact that aberrations vary with object distances. Generally, in planning, a reproduction ratio of 1:10 or thereabouts is selected as the starting point at which the best optical performance is obtained. However, in many cases, when it comes to objectives of relatively large apertures or wide angle objectives, the range of variations of aberration increases as the reproduction ratio increases. The spherical aberration and asymmetrical aberration of extra-axial rays of light deteriorate remarkably. This is because the paraxial pencil from a close object tends to diverge more strongly than an infinitely distant object so that it is near the stop that the paraxial pencil transits to divergence. Therefore, the spherical aberration of the positive lens group that follows the stop becomes inadequate for effective compensation. Also, since the principal ray of the extra-axial pencil forms a smaller angle with the optical axis when focusing down to shorter distances, outward coma is often produced. Such large variations of the aberrations with different reproduction ratios makes it meaningless to optimize the aberration correction at the reproduction ratio of 1/10 or thereabouts when the object distance is infinite or very close because if fails to preserve high optical performance. In order to prevent such loss in the imaging performance due to the change of the reproduction ratio, it has been a common practice to impart a floating movement into part of the optical system. Objectives attempting to use such a system are disclosed in U.S. Pat. No. 3,884,557, Japanese Laid-Open Patent Applications Sho 52-7723, 53-10425 and 55-28038. However, such conventional methods are complicated and incapable of providing the desired improvement in performance, and permit the interval between the principal points of the lens group to be widened enough so that the focal length varies extensively.

SUMMARY OF THE INVENTION

The present invention is directed particularly toward the prevention of the loss in aberration correction due to the change of the image magnification by making part of the lens system to float. It is an object of the present invention to provide a novel floating method which has overcome the above-mentioned drawbacks of the conventional one.

It is a further object of the invention to provide an objective lens of large relative aperture which is well corrected for high grade imaging performance throughout an extended focusing range.

The present invention is characterized in that as the objective lens has a 1st lens group of positive power and a 2nd lens group of positive power, when focusing is effected from infinity down to shorter object distances, both of the 1st and 2nd lens groups are moved forwards while the air separation between these groups is simultaneously being widened.

BRIEF DESCRIPTION OF THE DRAWINGS

FIGS. 1-$b$ and 2-$b$ are lens block diagrams of embodiments 1 and 2 respectively when focused to a reproduction ratio of $\frac{1}{2}$.

FIGS. 3-$a$, $b$, $c$, $d$ and 4-$a$, $b$, $c$, $d$ are graphic representations of the various aberrations of the lens of FIG. 1 with the object at infinity and at $\frac{1}{2}$ in the reproduction ratio (where the lens separation D6 is taken at 0.2380).

FIGS. 5-$a$, $b$, $c$, $d$ and 6-$a$, $b$, $c$, $d$ are graphic representations of the various aberrations of the lens of FIG. 2 with the object at infinity and at $\frac{1}{2}$ in the reproduction ratio (where the lens separation D6 is taken at 0.1999).

DETAILED DESCRIPTION OF THE PREFERRED EMBODIMENT

Figure 1A:
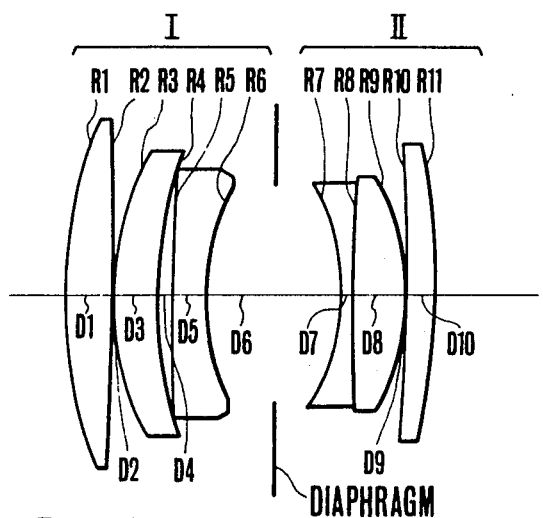
FIGS. 1-$a$ and 2-$a$ are lens block diagrams of embodiments 1 and 2 respectively according to the present invention with the object at infinity.
Figure 1B:
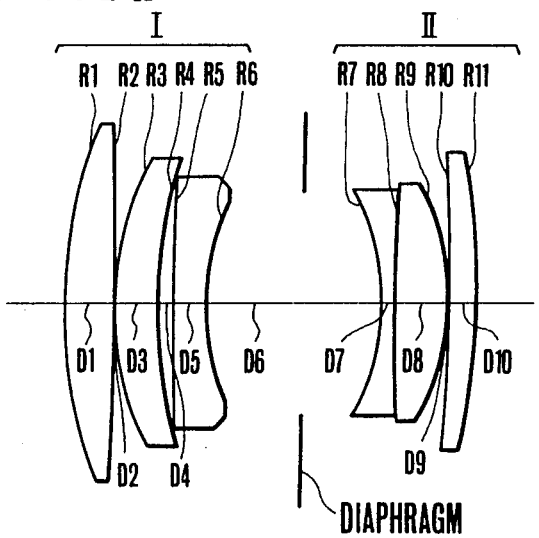
Figure 2A:
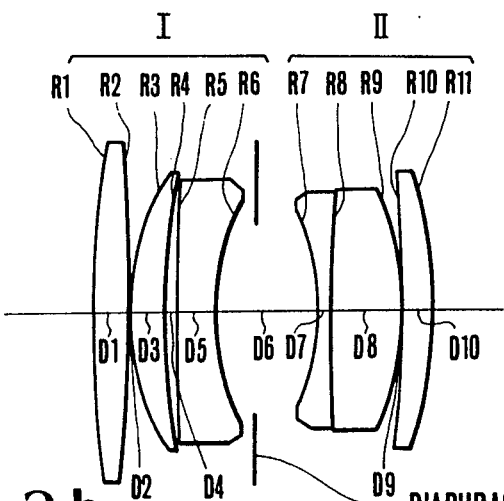
Figure 2B:
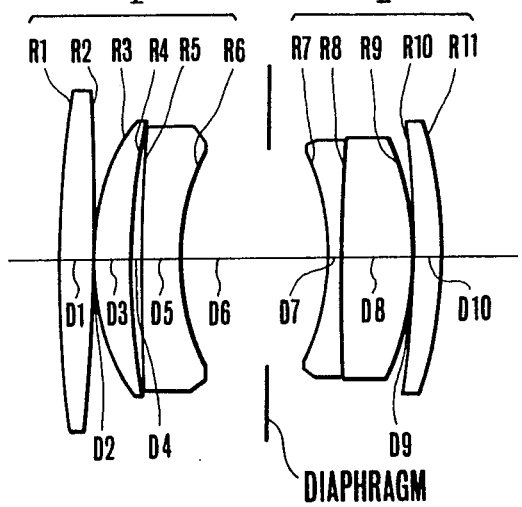
Figures 6A, 6B, 6C:
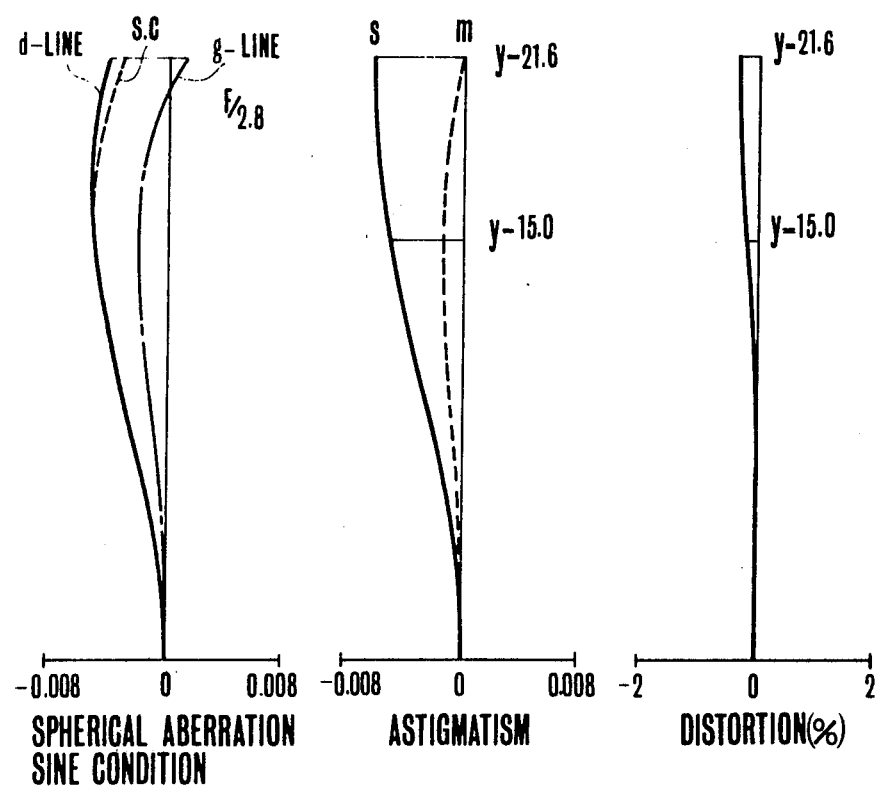
Figure 6D:
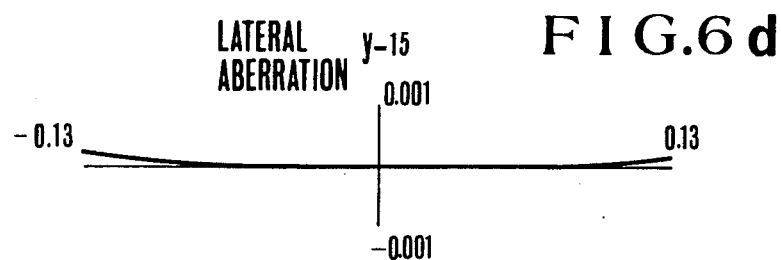

Embodiments of the present invention are shown in lens block diagrams of FIGS. 1 and 2. The construction of each of the embodiments of the objective has two lens groups, of which the first counting from the front has a positive refractive power and the second has also a positive refractive power. The first lens group has, from front to rear, a positive lens, a positive meniscus lens of forward convexity, and a negative meniscus lens of rearward concavity. The second lens group has, from front to rear, a cemented lens of a negative lens and a positive lens, and a positive lens. When focusing is being performed as from infinity to shorter object distances, the 1st and 2nd lens groups are axially moved forwards in a manner such that the air separation therebetween is being widened. Positioned in a space between the 1st and 2 nd lens groups is a diaphragm.

According to the present invention, the objective of the type described above has another feature that the widened air separation between the positive 1st and the positive 2nd lens groups, which are positioned almost symmetrically with respect to the diaphragm, facilitates the solution of outward coma which would be otherwise produced when focusing is effected down to shorter object distances. This is because the widening of the air separation between the 1st and 2nd lens groups permits the extra-axial pencil to be incident on the 2nd lens group at a higher height from the optical axis. Therefore, the refracting action is intensified to produce inward coma which cancels out the outward coma. On the other hand, as regards spherical aberration, the refractive power of the 1st lens group is adjusted so that the paraxial pencil after having emerged from the 1st lens group becomes an almost parallel pencil when the objective is focused on a close object. Thus, the aberration correction is kept good and the imaging performance is improved.

The objectives of the embodiments of the invention adopt the above-described constructional features and floating method to achieve good stability of aberration correction throughout the extended focusing range. To further improve the imaging performance, it is desirable to set forth the following conditions:

Now taking the focal length of the complete objective as unity, and letting Ri denote the radius of curvature of the i-th lens surface counting from the front, Di the i-th lens thickness or air separation counting from the front, and Ni and Vi the refractive index and dispersion of the glass of the i-th lens counting from the front respectively, it is desirable to satisfy the following inequalities:

$$1.60 < N_1 < 1.72 \quad (1)$$

$$1.59 < N_3 < 1.65 \quad (2)$$

$$48 < (V_1 + V_2 + V_3)/3 < 52 \quad (3)$$

$$R_2 < 0 \quad (4)$$

$$0.26 < |R_7| < 0.30; \, R_7 < 0 \quad (5)$$

$$0.08 < D_7 + D_8 < 0.11 \quad (6)$$

Each of the conditions given above is explained below. Condition (1) in relation with condition (4) is for good correction of the various aberrations. When the upper limit of inequalities (1) is exceeded, the Petzval sum of the entire system is decreased with an advantage to the image surface characteristics. But, the lens form becomes meniscus and increases negative distortion which is difficult to correct. When the lower limit is exceeded, the image surface characteristics become under, becoming difficult to correct. Condition (4) is for correction of distortion increase in the negative direction. When this condition is violated, the negative distortion is increased.

Condition (2) is for correction of the Petzval sum and balance of chromatic aberrations. When the upper limit of the inequalities (2) is exceeded, the image surface characteristics deteriorate badly, and correction of chromatic aberrations becomes difficult. When the lower limit is exceeded, the 2nd surface of that lens is so strongly curved that higher order spherical aberrations and coma flare begin to be produced.

Condition (3) concerns dispersion of the 1st lens group. Since the 1st and 2nd lens groups are farther separated from each other as are floating when focused to shorter object distances, the Abbe number of the glass material of each of the lenses in the 1st lens group is made relatively large so that chromatic aberrations are corrected to some degree within the 1st lens group, and good correction of chromatic aberrations of the lens system as a whole is achieved. When the upper limit of the inequalities (3) is exceeded, chromatic overcorrection results. When the lower limit is exceeded, chromatic under-correction results.

Condition (5) concerns the radius of curvature of the 1st surface of the 1st lens in the 2nd group. When the upper limit is exceeded, inward coma increases. When the lower limit is exceeded, over-correction of spherical aberration results.

Condition (6) concerns the combined thickness of the cemented lens in the 2nd group. When the upper limit is exceeded, the refractive power of the 2nd lens group decreases, and therefore correction of outward coma when in focusing to shorter object distances becomes insufficient. When the lower limit is exceeded, coma flare in the marginal zone of the picture frame increases causing a loss in the image quality.

Two examples of specific objectives of the invention can be constructed in accordance with the numerical data given below for the radii of curvature, R, the axial thicknesses and air separations, D, and the refractive indices and Abbe numbers of the glasses of the lens elements, N and $\nu$ respectively.

| Embodiment 1 | | | |
|---|---|---|---|
| Focal Length f = 1.0 | F-number 1:2.8 | | Image Angle 2ω 46° |
| R1 = 0.6191 | D1 = 0.0617 | N1 = 1.60311 | ν1 = 60.7 |
| R2 = −15.3974 | D2 = 0.0029 | | |
| R3 = 0.3784 | D3 = 0.0612 | N2 = 1.69680 | ν2 = 55.5 |
| R4 = 0.6367 | D4 = 0.0155 | | |
| R5 = 2.7059 | D5 = 0.0435 | N3 = 1.59551 | ν3 = 39.2 |
| R6 = 0.2779 | D6 = 0.1830 | | |
| R7 = −0.2662 | D7 = 0.156 | N4 = 1.59551 | ν4 = 39.2 |
| R8 = 3.4723 | D8 = 0.0670 | N5 = 1.69680 | ν5 = 55.5 |
| R9 = −0.3244 | D9 = 0.0029 | | |
| R10 = −3.7721 | D10 = 0.0399 | N6 = 1.77250 | ν6 = 49.6 |
| R11 = −0.8265 | | | |

| Embodiment 2 | | | |
|---|---|---|---|
| Focal Length f = 1.0 | F-number 1:2.8 | | Image Angle 2ω = 46° |
| R1 = 1.3979 | D1 = 0.0465 | N1 = 1.72000 | ν1 = 50.2 |
| R2 = −3.2440 | D2 = 0.0029 | | |
| R3 = 0.3313 | D3 = 0.0445 | N2 = 1.69680 | ν2 = 55.5 |
| R4 = 0.7984 | D4 = 0.0155 | | |
| R5 = 2.0789 | D5 = 0.0503 | N3 = 1.65016 | ν3 = 39.4 |
| R6 = 0.2798 | D6 = 0.1398 | | |
| R7 = −0.3058 | D7 = 0.0193 | N4 = 1.59270 | ν4 = 35.3 |
| R8 = 4.4708 | D8 = 0.0905 | N5 = 1.69680 | ν5 = 55.5 |
| R9 = −0.4218 | D9 = 0.0029 | | |
| R10 = −1.5572 | D10 = 0.0386 | N6 = 1.77250 | ν6 = 49.6 |
| R11 = −0.5834 | | | |

What is claimed is:

1. An objective lens of large relative aperture comprising:

from front to rear, a first lens group having a positive refractive power and having a positive lens with its front surface convex toward the front, a positive meniscus lens of forward convexity and a negative meniscus lens of rearward concavity, and a second lens group having a positive refractive power and having a cemented lens and a positive lens, said cemented lens including a negative lens and a positive lens, said lenses being arranged so that when focusing is effected from an infintely distant object to a close object each of said lens groups is moved axially forward while the air separation between said lens groups is widened, taking the focal length of the entire system as unity, and letting Ri denote the radius of curvature of the i-th lens surface counting from the front, Di the i-th thickness and air separation counting from the front, and Ni and Vi the refractive index and Abbe number of the glass material of the i-th lens element counting from the front respectively, the conditions:

$$1.60 < N1 < 1.72$$

$$1.59 < N3 < 1.65$$

$$48 < (V_1 + V_2 + V_3)/3 < 52$$

$$R2 < 0$$

$$0.26 < |R7| < 0.30; \, R7 < 0$$

$$0.08 < D7 + D8 < 0.11$$

are satisfied.

* * * * *